April 4, 1950
W. O. WEBBER
2,503,014
METHOD FOR RESOLVING EMULSIONS
Filed March 20, 1947
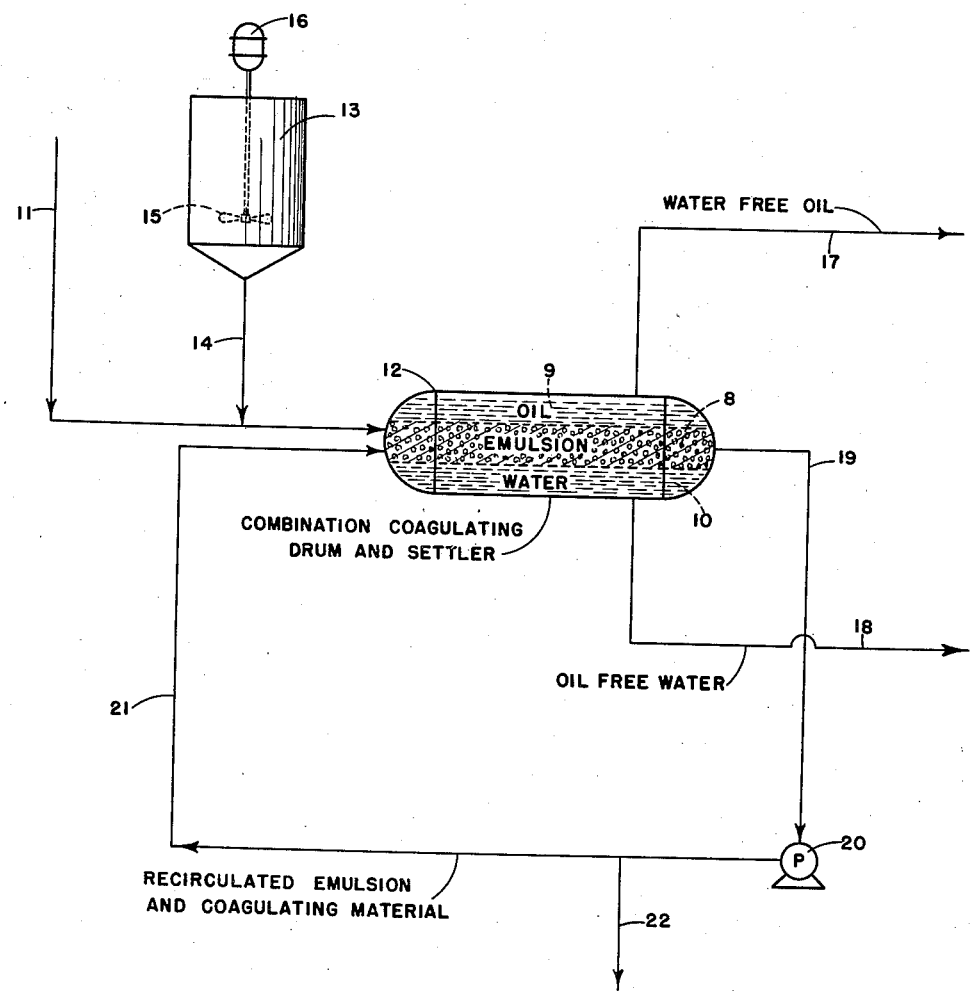
William O. Webber, INVENTOR.
BY
ATTORNEY.

Patented Apr. 4, 1950

2,503,014

UNITED STATES PATENT OFFICE 2,503,014

METHOD FOR RESOLVING EMULSIONS

William O. Webber, Baytown, Tex., assignor, by mesne assignments, to Standard Oil Development Company, Elizabeth, N. J., a corporation of Delaware Application March 20, 1947, Serial No. 736,073

5 Claims. (Cl. 252—325)

This invention relates to a method for the resolution of liquid emulsions and more particularly to the resolution of the emulsions difficult to separate by ordinary means.

In many cases it has been found that two immiscible fluids form emulsions that are extremely difficult to resolve by ordinary treating methods. Certain water-in-oil and oil-in-water emulsions form which are easily resolved into separate components by adding suitable treating agents such as sodium stearate, calcium stearate, or sodium sulfonates, or by passing the emulsion through a coagulating medium comprising sand, wood shavings, or carbon and subsequently settling the treated or contacted emulsion to separate it into its component parts. If, on the other hand, the emulsion is extremely stable or tight, the addition of a treating agent or passage of the emulsion through a coagulating medium will sometimes not suffice to cause a resolution thereof. The difficultly resolved emulsion in such cases may be retreated or recontacted or may be discarded, either operation being inefficient and expensive.

As an example, it may be mentioned that emulsions formed between crude oil and water are frequently resolved by passage through a coagulating medium of packed sand. The treated emulsion is then continuously passed to a settler having a volume chosen so as to provide sufficient time for the water droplets to disengage themselves from the oil phase and for the oil droplets to disengage themselves from the water phase. The separated oil and water phases are continuously withdrawn from the top and bottom of the settling zone. Some oil-in-water and water-in-oil emulsions formed between certain types of crude mineral oils and water, which are passed through a coagulating bed for the resolution of the emulsion and for the removal of salt from the oil phase, frequently form extremely stable emulsions which are not easily resolved by mere passage through the coagulating medium. Experience has demonstrated that the accumulation rate of the stable emulsion is extremely erratic and difficult to predict; therefore, withdrawal of the stable emulsion from the settling zone may not be carried out at a uniform rate. The stable emulsion which is not resolved in the coagulating step accumulates as a layer between the oil and water phases in the settling zone. At times the stable emulsion which accumulates in the settling zone must be discarded because of the difficulty involved in obtaining adequate resolution of the emulsion components. It is undesirable to discard the stable emulsion forming in the settling zone because of the loss of valuable oil or other component involved.

It is the object of this invention to provide a means of resolving stable emulsions that are not easily separable into their component parts by usual demulsification methods.

It is a further object of this invention to provide an effective method for resolving stable emulsions in a continuous and simple manner.

I have found that stable emulsions such as those frequently formed between oil and water remaining after treating oil-water emulsions by conventioinal procedures may be substantially completely resolved by prolonging the contact time between the stable emulsion and a suitable coagulating medium in a continuous manner that does not involve a large expenditure for equipment and that does not require extremely careful control. In essence, my invention comprises adding to the settling zone, in which a stable emulsion tends to form as an intermediate phase between resolved components of the emulsion, a finely divided solid having density characteristics such that it tends to remain suspended in the stable emulsion and will not float in the low specific gravity component or sink in the high specific gravity component of the emulsion. The finely divided solid added to the stable emulsion has coagulating properties such that a suspension of it in the stable emulsion for a suitable period of time will result in substantially complete resolution of the emulsion.

It is necessary in the successful operation of my invention to treat those emulsions composed of components having substantially different specific gravities. It is thus possible to choose a finely divided solid having coagulating properties and having density characteristics intermediate the specific gravities of the two components of the emulsion. The stable emulsion containing the suspended solid particles may then be recycled from one portion of the settling zone through a suitable circulating device back into another portion of the settling zone such that a prolonged contact time is maintained between the coagulating solids and the stable emulsion. Prolonged recycling of the mixture tends to resolve the emulsion into its component parts and the resolved components join the top or bottom layers of the previously resolved components in the settling zone.

My invention will now be described in more detail in conjunction with the sole figure which is in the form of a diagrammatic flow sheet illustrating one embodiment thereof.

The numeral 11 designates a line through which emulsion is charged to settling tank 12. The components of the stream passing through line 11 may comprise an emulsion of a crude oil having a specific gravity of about 0.8 and brine having a specific gravity slightly greater than 1.0, the emulsion of the two components having a specific gravity intermediate the specific gravities of the two components. This stream may have been previously passed through a coagulating bed such as sand to effect the resolution of the major portion of the emulsion existing in the original crude oil or it may comprise the untreated emulsion itself. An untreated emulsion between crude oil and brine may contain up to about 10 per cent brine, whereas the tight emulsion remaining after a preliminary treating operation may contain brine in concentrations up to 50 per cent or higher.

Line 11 discharges into settling zone 12 at a suitable point such that the brine will settle as a bottom phase 10 and the oil will float as a top phase 9 in the settling zone. The stable emulsion remains suspended between the oil and water phase as phase 8.

Hopper 13 connected to line 11 through line 14 may suitably contain a slurry of a finely divided coagulating solid and one of the components of the emulsion being resolved, such as, for example, water or brine. The slurry of finely divided solids and water may be kept in a mixed state by mixing means 15, actuated by a prime mover 16, which may suitably be a motor. The finely divided solid is selected such that its density is intermediate the specific gravities of the emulsion components and such that it will be preferentially wet by the components comprising the disperse phase of the emulsion. If, for example, a water-in-oil emulsion is to be resolved, a finely divided solid which is preferentially wet by water should be used. On the other hand, solids which are preferentially wet by an oil should be added for the resolution of oil-in-water emulsions.

The emulsion-breaking material withdrawn from hopper 13 in the form of a slurry may suitably be wood in the form of finely divided shavings or sawdust, the wood having a density between about 0.8 and 1.0 gram/cc. if it is to be added to emulsions comprising brine in crude oil. Wood particles derived from blue gum, box, log wood, Spanish mahogany, oak, satin wood, African teak and water gum may be mentioned as being suitable in the practice of the present invention for emulsions of varying specific gravities. The finely divided wood shavings may be pretreated with a suitable chemical in order to prolong their useful life as a coagulating substance. Wood shavings employed for the resolution of water and oil emulsions may satisfactorily be pretreated with a solution of an alkali hydroxide.

The constituents entering settling drum 12 tend to form three layers as previously mentioned, a top layer 9 comprising the low specific gravity component of the emulsion, an intermediate layer 8 comprising the stable emulsion admixed with a suitable coagulating medium, and a lower layer 10 comprising the high specific gravity component of the emulsion. The low specific gravity component may be removed from settling zone 12 through line 17 by a suitable pumping means not shown, and the high specific gravity component may be removed from the bottom of settling zone 10 through line 18. In some cases, one or both of the components withdrawn through lines 17 and 18 may be filtered through a suitable medium (not shown) to remove small quantities of the finely divided solid particles remaining therein. A woven filter cloth or screen of suitable mesh may be employed.

Line 19 attached to settling zone 12 is placed at a suitable point such that the stable emulsion layer containing solids suspended therein may be continuously removed from the settling drum and pumped through suitable pumping means 20 through circulating line 21 back into treating zone 12 at a point such that the recirculated material will join the stable emulsion layer intermediate the resolved layers. Periodically, a portion of the stable emulsion and suspended solids may be withdrawn from circulating line 21 through outlet 22 and discarded. This discard of a small portion of the stable emulsion is required to eliminate from the system a portion of the solids which have lost their power for coagulating the stable emulsion. The removal of a small amount of finely divided solids along with the stable emulsion through line 22 may coincide with the addition of an equal quantity of fresh solids in the form of a slurry through line 14. Thus, a fairly constant concentration of solids may be maintained in the stable emulsion layer formed in the settling zone and recycled through lines 19 and 21.

The concentration of the solid particles added to the stable emulsion will depend on a number of factors. The ease with which the particles tend to coagulate the stable emulsion after prolonged contact time will determine to a great extent the amount of solids required. Also the amount of recirculation of the stable emulsion which may be used economically will affect the concentration requirements. It may be mentioned that the stable emulsion remaining after passing a Panhandle crude having a specific gravity of about 0.80 through a bed of sand has a specific gravity of from 0.81 to 0.95. This emulsion may be resolved by adding thereto from 2 to 45 per cent of solids based on the stable emulsion. The solid particles may range from 0.002 inch to 0.50 inch in average diameter or thickness depending on their shape. They should have density characteristics very similar to the specific gravity characteristics of the stable emulsion such that the particles will remain suspended in the emulsion and will have no tendency to float in the low specific gravity constituent or sink in the high specific gravity constituent of the resolved emulsion.

As previously mentioned, the selection of the demulsifying solid particles to be suspended in the stable emulsion is extremely important with reference to the size. The particles should be sufficiently small to give a large surface area per unit volume. If the particles are too small, they will be carried out of the settler even at the very low vertical settling velocities usually obtained in extremely large settlers. In most cases, the particles may range from 0.01 to 0.08 inch in average diameter or thickness to give the maximum contacting surface without settling at extremely fast rates into the high specific gravity component of the resolved emulsion.

It is realized that there are many applications of my invention to the breaking of stable emulsions. Therefore, I do not intend to be restricted to any specific mode of carrying out the practice of my invention such as has been used for purposes of illustration.

Having fully described and illustrated the practice of the present invention, what I desire to claim as new and useful and to secure by Letters Patent is:

1. A method for resolving an emulsion of a mineral oil and water into its component parts which includes the steps of suspending in intimate admixture with said emulsion an amount in the range between 2% and 45% based on the emulsion of finely divided solid particles of wood having average diameters in the range between 0.002 and 0.5 inch and having the property of resolving said emulsion and having density characteristics in the range of between 0.8 and 1.0 gram/cc. intermediate the specific gravities of the resolved components of said emulsion, separating the admixture into at least two phases each of which comprises as a major component one of the constituents of the emulsion, and recovering the separated phases.

2. A method for resolving an emulsion of water in mineral oil into an oil phase substantially free from water and a water phase substantially free from oil which comprises the steps of suspending in said emulsion an amount in the range between 2% and 45% based on the emulsion of finely divided solid particles of wood having average diameters in the range between 0.002 and 0.5 inch and having the property of being preferentially wet by the disperse phase of said emulsion and having an average density in the range 0.8 and 1.0 gram/cc. intermedite the specific gravities of said water and said oil, contacting said emulsion with said finely divided solid particles for a sufficient time to cause the resolution thereof and to form an oil phase and a water phase, and recovering an oil phase substantially free of water and a water phase substantially free of oil.

3. In an emulsion comprising a crude oil as the continuous phase and a brine solution as the disperse phase, the method of resolving said emulsion into a crude oil phase substantially free from brine and a brine substantially free from oil comprising the steps of suspending in said emulsion an amount in the range between 2% and 45% based on the emulsion of finely divided wood particles having average diameters in the range between 0.002 and 0.5 inch and preferentially wet by said brine phase and having an average density in the range between 0.8 and 1.0 gram/cc. intermediate the specific gravities of said oil and brine phase, contacting said emulsion with said wood particles for a period of time sufficient to resolve said emulsion into an oil phase and a water phase, and recovering the oil phase substantially free of brine and the brine phase substantially free of oil.

4. A method for continuously resolving a brine-in-crude oil emulsion into its component parts which includes the steps of intimately admixing the emulsion with an amount in the range between 2% and 45% based on the emulsion of finely divided wood particles having average diameters in the range between 0.002 and 0.5 inch and having an average density substantially equal to the specific gravity of said emulsion, continuously charging said admixture in a settling zone wherein an upper oil phase, an intermediate phase comprising unresolved portions of the emulsion admixed with wood particles and a lower brine phase form, continuously withdrawing the oil, emulsion and water phases from said zone, and continuously recycling a portion of said emulsion phase back to said settling zone.

5. A method in accordance with claim 4 in which the density of the finely divided wood particles is in the range between 0.8 and 1.0 grams per cc.

WILLIAM O. WEBBER.

REFERENCES CITED

The following references are of record in the file of this patent:

UNITED STATES PATENTS

| Number | Name | Date |
| --- | --- | --- |
| 1,591,728 | Trent | July 6, 1926 |
| 1,593,893 | Barry | July 27, 1926 |
| 1,617,201 | Dons | Feb. 8, 1927 |
| 1,687,314 | Robinson | Oct. 9, 1928 |
| 1,696,057 | Robinson | Dec. 18, 1928 |
| 1,887,774 | Meinzer | Nov. 15, 1932 |
| 1,944,479 | Van Loenen | Jan. 23, 1934 |